June 2, 1925.

1,540,155

H. H. WYDOM ET AL

DETACHABLE METAL HANDLE FOR BATTERY BOXES

Filed Oct. 25, 1924

Inventors:
Herbert H. Wydom, &
Joseph E. Perrault,
by Spear, Middleton, Donaldson & Hall
Attys.

Patented June 2, 1925.

1,540,155

UNITED STATES PATENT OFFICE.

HERBERT H. WYDOM AND JOSEPH E. PERRAULT, OF WATERTOWN, MASSACHUSETTS, ASSIGNORS TO HOOD RUBBER COMPANY, OF WATERTOWN, MASSACHUSETTS, A CORPORATION OF MASSACHUSETTS.

DETACHABLE METAL HANDLE FOR BATTERY BOXES.

Application filed October 25, 1924. Serial No. 745,835.

*To all whom it may concern:*

Be it known that we, HERBERT H. WYDOM and JOSEPH E. PERRAULT, citizens of the United States, and residents of Watertown, in the county of Middlesex and State of Massachusetts, have invented certain new and useful Improvements in Detachable Metal Handles for Battery Boxes, of which the following is a specification.

Our present invention relates to a detachable metal handle for lifting or otherwise handling articles such as battery boxes.

The principal object of the invention is the provision of a handle which may be readily attached to the handles already existing on such an object as a battery box so that the same may be readily lifted or transported without the operator coming in contact with the acid usually existing in and around such batteries.

Another object is the provision of means as above which may be quickly attached to and detached from such batteries, as desired.

Still another and important object is the provision of such a handle which will be adaptable to various types of battery boxes, and one which will allow the battery box to be swung pivotally from the handle when it is necessary to jockey the box into its desired location.

To this end the invention contemplates a metal bail having clips pivoted thereto, said clips having hooks thereon which are adapted to engage the handle usually existing in articles such as a battery box.

We have illustrated in the accompanying drawings one form of the invention which is particularly adaptable to the use above stated, but this embodiment is to be taken merely as illustrative of the principle involved, and not in a limiting sense.

In the drawings:—

Figure 1:
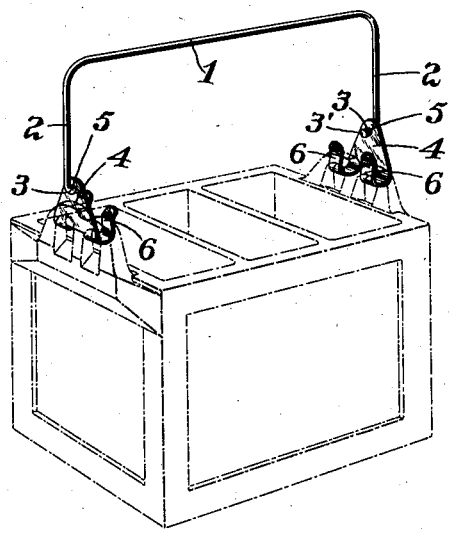
Figure 1 is a perspective view of one embodiment of the invention, showing its application.
Figure 3:
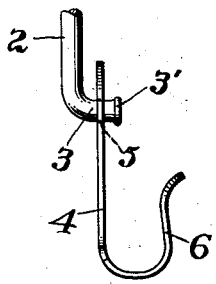
Fig. 3 is an end elevation.
Figure 2:
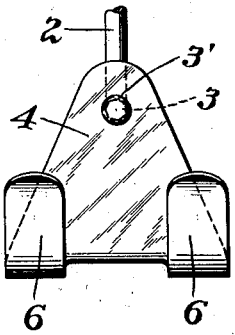
Fig. 2 is a side elevation.
Figure 4:
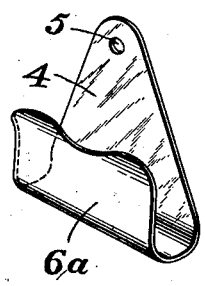
Fig. 4 is a perspective view of a modified form.

Referring now to the form illustrated, we have represented at 1 a metal bail having downwardly extending arms 2 with turned-in ends 3. Hung from the ends 3 we provide clips 4 perforated as at 5 to receive the end of the part 3. The ends 3 projecting beyond the main body of the clip 4, are preferably headed over, as at 3' to prevent the clip from becoming detached therefrom.

The clip 4 proper may be stamped or pressed from sheet metal and be provided with hooks 6. The particular design of the hooks, that is, their location on the main body 4 of the clips, will be determined by the type of battery box with which the device is to be used. Battery boxes are constructed usually with handles. Some boxes are provided with handles having two apertures therein, that is, those that are adapted to be raised by the operator placing one or two fingers in each aperture in the handle, and others are so constructed that the operator may place his whole hand, or the four fingers of one hand within a single aperture in the handle. For the former style of box, it will be found desirable to place the hooks 6 of the clip 4 in spaced apart relation, as illustrated, each hook 6 gripping that part of the handle above the finger hold. In the latter instance, it will probably be found desirable to provide a hook 6ª extending the full length of the lower edge of the clip 4. In all cases it is desirable that the upwardly extending arm of the hooks 6 and 6ª be bent slightly outward and away from the main body of the clip 4 in order to enable the hook to slip quickly and readily over the battery box handle. It will be noted that when the hook takes the form as shown at 6, it is not only adapted for a battery box handle having more than one finger hole, but may be readily used with that type of handle in which there is but a single hand hold.

It is to be noted that the bail 1 is pivotally secured to the clip 4 so that there may be rotation between these parts. This is particularly desirable when it is found necessary to jockey a battery into an awkward position into an automobile or the like, in which the battery is used.

Obviously both bail and clip may be made of any desirable materials consistent with quality and the purposes for which the article is to be used.

Obviously such a detachable handle may be used for purposes other than batteries, although it is particularly adaptable to the use of storage batteries for any purpose, such as those used for ignition or radio work, as such batteries are known to have acid accidentally spilled on the outside thereof, in which case the operator is desirous of handling the battery in a way to prevent the acid getting upon his hands.

Having thus described our invention, what we claim is:—

A detachable handle for battery boxes comprising a wire bail having a straight handle portion of substantially the length of the box and vertically depending portions having inwardly curved lower ends, and a pair of sheet metal carrying clips of substantially triangular form suspended from said vertically depending portions, each of said clips having an eye adjacent its apex through which the corresponding curved end of the bail passes, said end being upset to retain the clip thereon, the lower portions of the clips being bent inward to form handle engaging hooks having inclined upper ends.

In testimony whereof, we affix our signatures.

HERBERT H. WYDOM.
JOSEPH E. PERRAULT.